US011336159B2

(12) United States Patent
Kato et al.

(10) Patent No.: US 11,336,159 B2
(45) Date of Patent: May 17, 2022

(54) MANUFACTURING METHOD OF ROTOR

(71) Applicant: AISIN CORPORATION, Kariya (JP)

(72) Inventors: Susumu Kato, Anjo (JP); Hideharu Ushida, Anjo (JP); Shohei Ohashi, Chiryu (JP)

(73) Assignee: AISIN CORPORATION, Kariya (JP)

(*) Notice: Subject to any disclaimer, the term of this patent is extended or adjusted under 35 U.S.C. 154(b) by 0 days.

(21) Appl. No.: 16/769,289

(22) PCT Filed: Jan. 11, 2019

(86) PCT No.: PCT/JP2019/000708
§ 371 (c)(1),
(2) Date: Jun. 3, 2020

(87) PCT Pub. No.: WO2019/139128
PCT Pub. Date: Jul. 18, 2019

(65) Prior Publication Data
US 2020/0295637 A1   Sep. 17, 2020

(30) Foreign Application Priority Data

Jan. 11, 2018 (JP) .............................. JP2018-002675

(51) Int. Cl.
*H02K 15/02* (2006.01)
*H02K 1/28* (2006.01)

(52) U.S. Cl.
CPC .............. *H02K 15/02* (2013.01); *H02K 1/28* (2013.01); *Y10T 29/49012* (2015.01)

(58) Field of Classification Search
CPC ..... B21D 28/12; B23Q 3/155; Y10T 29/5168; Y10T 29/49012; Y10T 29/53143; Y10T 29/53652; H02K 15/03; H02K 1/278; H02K 1/28; H02K 15/02; F04D 29/053
USPC .............. 29/598, 596, 602.1, 604, 607, 609
See application file for complete search history.

(56) References Cited

U.S. PATENT DOCUMENTS 6,141,856 A * 11/2000 Johnson ............... H02K 1/2733
29/598
9,065,318 B2 * 6/2015 Komiya .................... H02K 1/28

FOREIGN PATENT DOCUMENTS

JP    2015-119557 A    6/2015

OTHER PUBLICATIONS

International Search Report of PCT/JP2019/000708 dated Mar. 19, 2019 [PCT/ISA/210].

* cited by examiner

*Primary Examiner* — Thiem D Phan
(74) *Attorney, Agent, or Firm* — Sughrue Mion, PLLC

(57) ABSTRACT

The manufacturing method of a rotor includes: a step of preparing a plate that is composed of an austenitic material and that has a projected portion and a part with a width in a rotational axis direction smaller than a width of the projected portion in the rotational axis direction; and a step of forming a welded portion across the projected portion of the plate and a rotation transmitting member by emitting an energy beam on at least a part of the projected portion to melt at least a part of the projected portion.

20 Claims, 8 Drawing Sheets

| | D1 | | | | |
|---|---|---|---|---|---|
| | 0 | 0.4×φ | 0.8×φ | 1.2×φ | 1.6×φ |
| COMPARATIVE EXAMPLE | × | × | ○ | ○ | × |
| W21 0.8×φ | ○ | ○ | ○ | × | × |
| 2.0×φ | ○ | ○ | ○ | ○ | × |

| r | EVALUATION |
|---|---|
| 30% | × |
| 40% | ○ |
| 50% | ○ |
| 60% | ○ |
| 70% | ○ |
| 80% | ○ |
| 90% | × |

MANUFACTURING METHOD OF ROTOR

CROSS REFERENCE TO RELATED APPLICATIONS

This application is a National Stage of International Application No. PCT/JP2019/000708, filed Jan. 11, 2019, claiming priority from Japanese Patent Application No. 2018-002675, filed Jan. 11, 2018, the contents of which are incorporated in their entirety by reference.

TECHNICAL FIELD

Aspect of the disclosure related to a manufacturing method of a rotor.

BACKGROUND ART

Conventionally, a manufacturing method of a rotor including a plate and a rotation transmitting member is known. Such a manufacturing method of a rotor is disclosed in Japanese Unexamined Patent Application Publication No. 2015-119557 (JP 2015-119557 A), for example.

JP 2015-119557 A discloses a manufacturing method of a rotor including a rotor core, end plates (plate), and a shaft body (rotation transmitting member). In the manufacturing method of the rotor, an inner peripheral surface of the rotor core and an outer peripheral surface of the shaft body are welded. Then, plate inner peripheral surfaces of the end plates and the outer peripheral surface of the shaft body are welded. In this way, the rotor in which the rotor core, the shaft body, and the end plates are fixed to each other is manufactured.

RELATED ART DOCUMENTS

Patent Documents

Patent Document 1: Japanese Unexamined Patent Application Publication No. 2015-119557 (JP 2015-119557 A)

SUMMARY OF THE DISCLOSURE

Problem to be Solved by the Various Aspects of the Disclosure

Here, although not described in JP 2015-119557 A, it is preferable that the rotation transmitting member (shaft body) be configured of a material having a relatively hard structure, in view of a function of transmitting rotational motion between the rotor core and a shaft or a gear portion or the like. Specifically, the rotation transmitting member is composed of a martensitic material. Although the structure of martensite is harder than the structure of austenite or the structure of ferrite, martensitic material is disadvantageous in that low-temperature cracking, which is cracking that occurs after welding to another member (plate), is likely to occur. When low-temperature cracking occurs, it is difficult to ensure joining strength of the welded part. Thus, there has conventionally been a demand for a manufacturing method of a rotor where joining strength can be ensured when a plate is welded and fixed to a rotation transmitting member composed of a martensitic material.

The various aspects of the present disclosure have been made to solve the problem described above, and it is one aspect of the present disclosure to provide a manufacturing method of a rotor in which joining strength can be ensured even when a plate is welded and fixed to a rotation transmitting member composed of a martensitic material.

Means for Solving the Problem

In order to achieve the above aspect, a manufacturing method of a rotor including a rotor core, a plate that is disposed on at least one side of the rotor core in a rotational axis direction, and a rotation transmitting member that is composed of a martensitic material and that is welded and fixed to the plate. The manufacturing method includes: a step of preparing the plate that has a projected portion that is provided adjacent to the rotation transmitting member in a radial direction and that is projected, from an end face in the rotational axis direction, in a direction away from the rotor core out of the rotational axis direction, and a part that is adjacent to the projected portion in the radial direction and that has a width in the rotational axis direction smaller than a width of the projected portion in the rotational axis direction, the plate being formed of an austenitic material; a step of disposing the rotation transmitting member radially inward of the plate, after the step of preparing the plate; and a step of forming a welded portion across the projected portion of the plate and the rotation transmitting member by emitting an energy beam on at least a part of the projected portion to melt at least a part of the projected portion, after the step of disposing the rotation transmitting member.

In the rotor manufacturing method according to one aspect of the present disclosure, as described above, at least a portion of the projected portion is melted to form the welded portion across the projected portion of the plate and the rotation transmitting member. In this way, it is possible to decrease the heat capacity of the projected portion (a part of the plate to be melted), compared to when a part of the plate to be melted is formed as a surface that is not projected. As a result, since the melted amount of the plate composed of the austenitic material can be increased compared to when the projected portion is not provided, it is possible to increase the melting ratio of the austenitic material in the welded portion. As a result, since low-temperature cracking can be made less likely to occur in the welded portion, it is possible to ensure joining strength even when the plate is welded and fixed to the rotation transmitting member composed of martensitic material. Here, in order to increase the melting ratio of the austenitic material in the welded portion, it is conceivable that welding is performed while a welding wire composed of the austenitic material is supplied to the part being melted. However, in this case, there is a problem that the rotor manufacturing equipment increases in size, since it is necessary that a rotor manufacturing equipment is provided with a wire supply device that supplies the welding wire, separately from the welding device. In contrast, in the manufacturing method of the rotor according to the first aspect of the present disclosure, it is possible to melt the projected portion that is composed of austenitic material and that is provided beforehand on the plate. It is thus possible to increase the melting ratio of the austenitic material in the welded portion without the rotor manufacturing equipment being provided with the wire supply device. As a result, it is possible to ensure joining strength of the rotation transmitting member and the plate while preventing the rotor manufacturing equipment (welding equipment) from increasing in size.

Effects of the Disclosure

According to the present disclosure, as described above, joining strength can be ensured even when the plate is welded and fixed to the rotation transmitting member composed of a martensitic material.

DETAILED DESCRIPTION

Hereinafter, an embodiment of the present disclosure will be described with reference to the drawings.

[Rotor Structure]

The structure of a rotor 100 according to the first embodiment will be described with reference to FIGS. 1 to 8.

Figure 1:
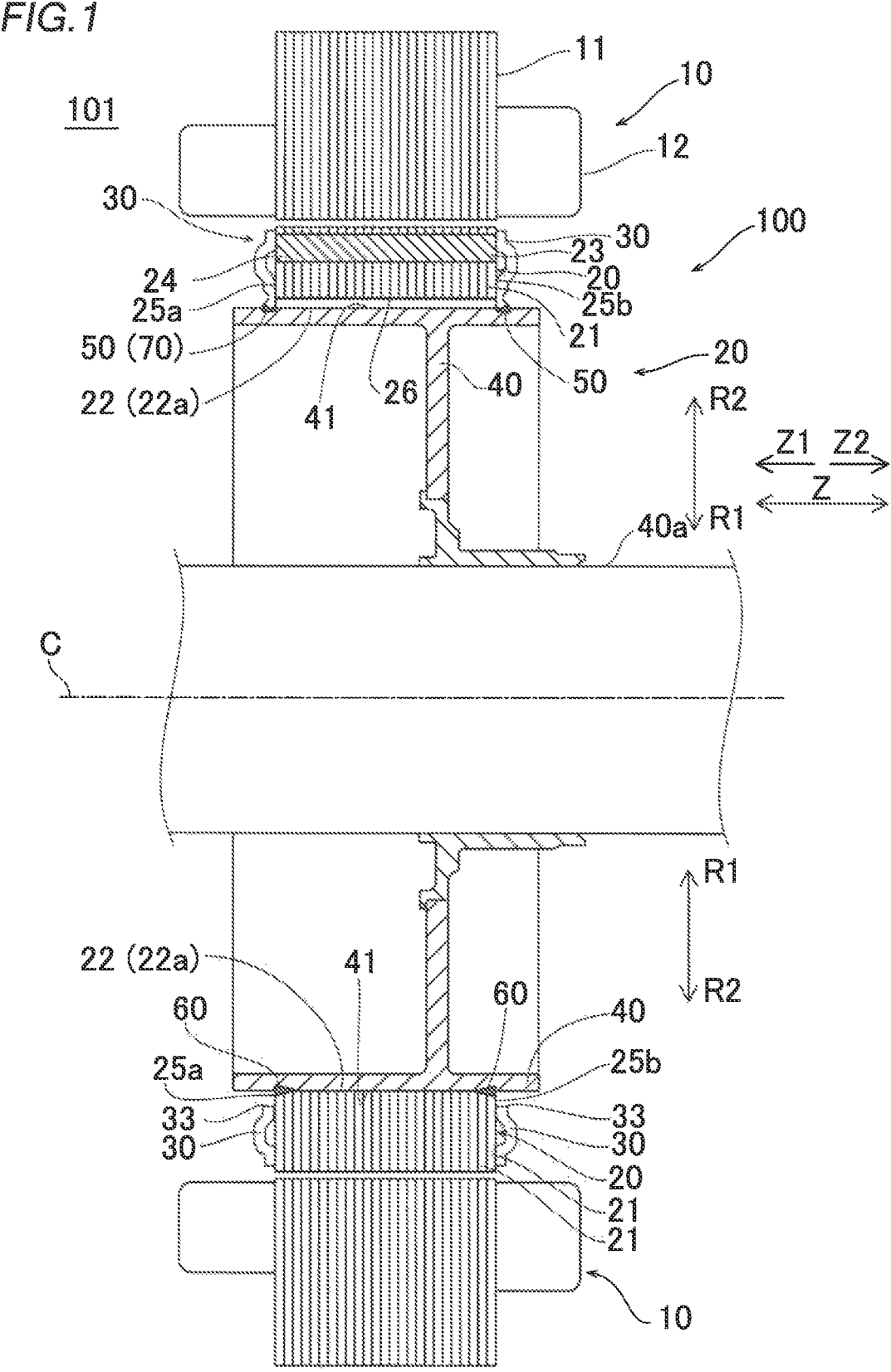
FIG. 1 is a cross-sectional view of a rotor (rotating electrical machine) according to an embodiment of the present disclosure, and is a cross-sectional view taken along line 600-600 in FIG. 2.

In the present specification, a "rotational axis direction" means a direction along a rotational axis C of the rotor 100 (Z direction, see FIG. 1). A "circumferential direction" means a circumferential direction of the rotor 100 (arrow A1 direction or arrow A2 direction, see FIG. 2). Further, "radially inward" means a direction toward the center of the rotor 100 (arrow R1 direction). In addition, "radially outward" means a direction toward the outside of the rotor 100 (arrow R2 direction).

As illustrated in FIG. 1, the rotor 100 forms a part of a rotating electrical machine 101. For example, the rotating electrical machine 101 is configured as an inner rotor type rotating electrical machine. That is, in the rotating electrical machine 101, the stator 10 is disposed radially outward of the rotor 100. The stator 10 includes a stator core 11 and a winding 12 wound around the stator core 11.

The rotor 100 includes a rotor core 20, end plates 30, and a hub member 40. The end plates 30 and the hub member 40 are joined to each other by first welded portions 50. The rotor core 20 and the hub member 40 are joined to each other by second welded portions 60. The end plates 30 are an example of a "plate" in the claims. The hub member 40 is an example of a "rotation transmitting member" in the claims. The first welded portions 50 are an example of a "welded portion" in the claims. The second welded portions 60 are an example of a "core welded portion" in the claims.

(Structure of Rotor Core)

As illustrated in FIG. 1, the rotor core 20 includes a plurality of electromagnetic steel plates 21. The rotor core 20 is formed by stacking the electromagnetic steel plates 21 in the rotational axis direction (Z direction) in which the rotational axis C extends. The electromagnetic steel plates 21 are composed of, for example, a silicon steel sheet that is a magnetic material. Each of the electromagnetic steel plates 21 is formed in an annular shape with the rotational axis C as the center, and the electromagnetic steel plates 21 are configured to have a cylindrical shape and extends in the rotational axis direction when stacked.

A through hole 22 is provided radially inward of the rotor core 20. The hub member 40 is disposed in the through whole 22 of the rotor core 20. A core inner peripheral surface 22a that configures the through whole 22 of the rotor core 20 and an outer peripheral surface 41 of the hub member 40 are joined by the second welded portions 60.

Figure 2:
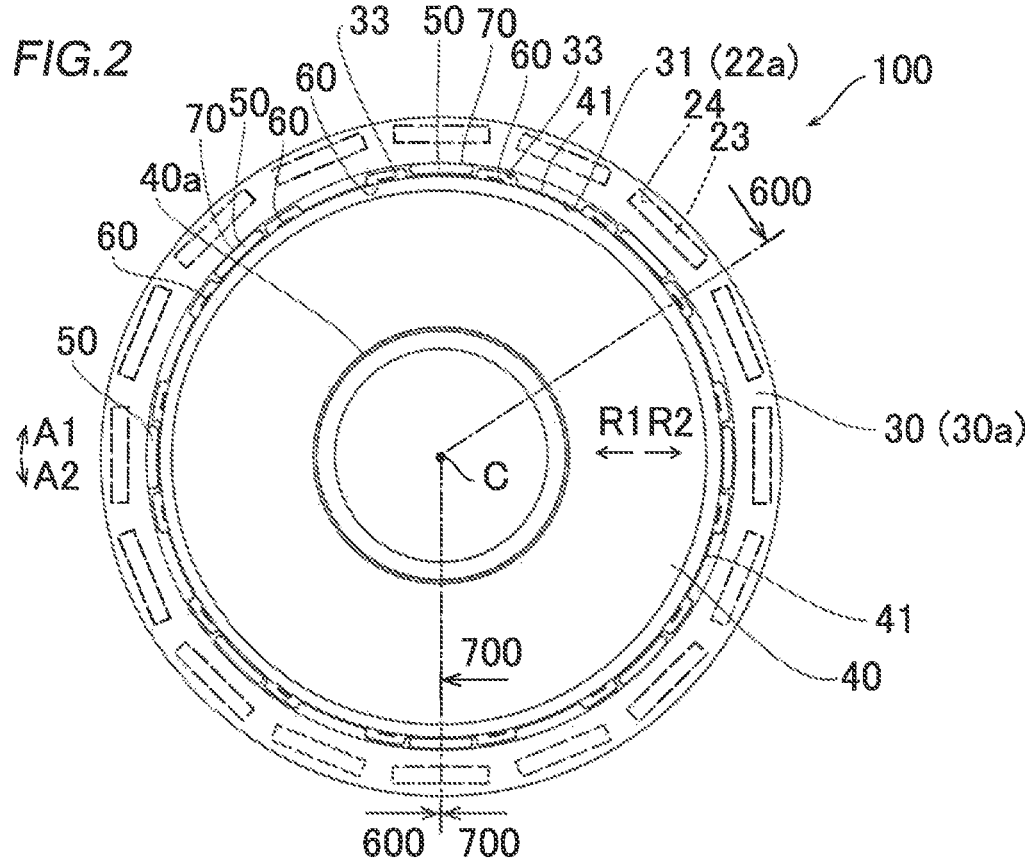
FIG. 2 is a view of the rotor according to the embodiment of the present disclosure as viewed in a rotational axis direction.

The rotor core 20 is provided with a plurality of insertion holes 24 in which respective permanent magnets 23 are inserted. As illustrated in FIG. 2, the insertion holes 24 are provided at regular angular intervals along the circumferential direction of the annular rotor core 20. The insertion holes 24 are formed, for example, so as to extend from a core end face 25a of the rotor core 20 on the arrow Z1 direction side to a core end face 25b of the rotor core 20 on the arrow Z2 direction side.

Figure 3:
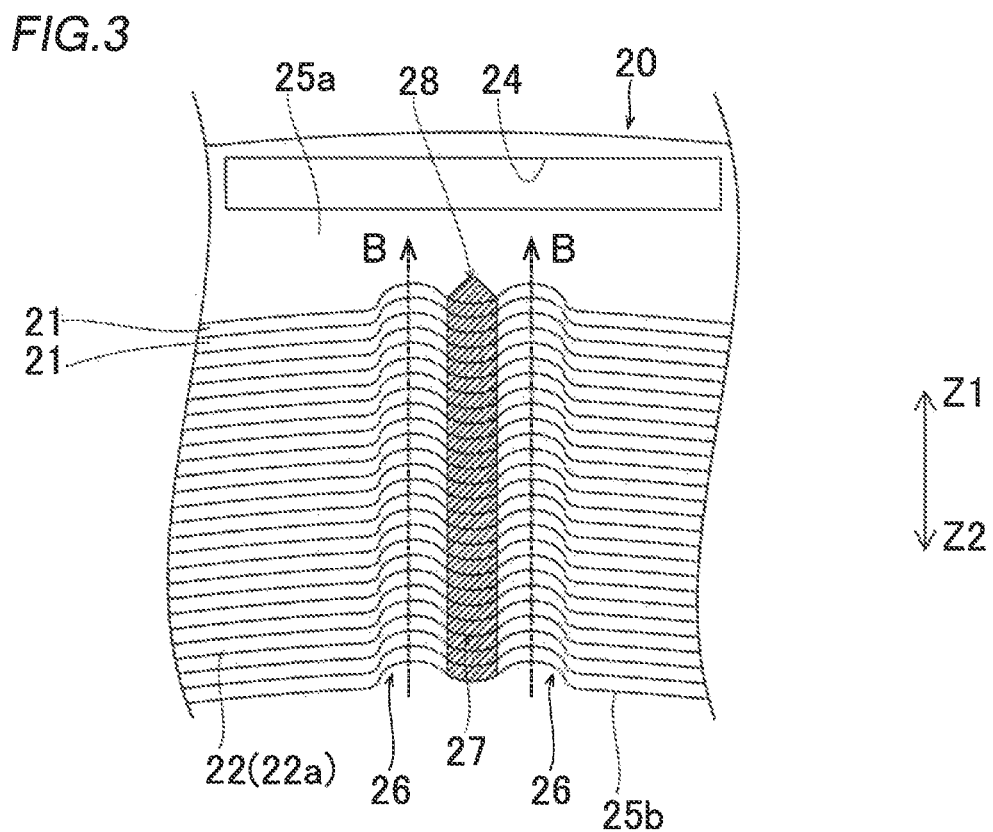
FIG. 3 is a perspective view of a part of a rotor core according to the embodiment of the present disclosure.

As illustrated in FIG. 3, the rotor core 20 is provided with the following: recessed portions 26 that are each recessed radially outward from the core inner peripheral surface 22a of the through hole 22 as viewed in the rotational axis direction; and a protruded portion 27 that is provided between two adjacent recessed portions 26 and that protrudes toward the rotational axis C. The recessed portions 26 are each formed, for example, as an oil passage that allows automatic transmission fluid (ATF) to pass through (for example, see arrow B in FIG. 3). The automatic transmission oil has a function of cooling the rotor 100 and the stator 10.

The rotor core 20 is provided with core forming welded portions 28 that are formed by melting the protruded portions 27. The magnetic steel plates 21 are joined to each other by the core forming welded portions 28. Specifically, the core forming welded portions 28 are each provided near the top of the protruded portion 27, so as to extend from the core end face 25a to the core end face 25b.

(Configuration of End Plate)

The end plates 30 are composed of a non-magnetic material. In the present embodiment, the end plates 30 are composed of stainless steel of austenitic material. The end plates 30 are preferably composed of, for example, SUS304 or SUS309 prescribed by the Japanese Industrial Standards (JIS).

Figure 4:
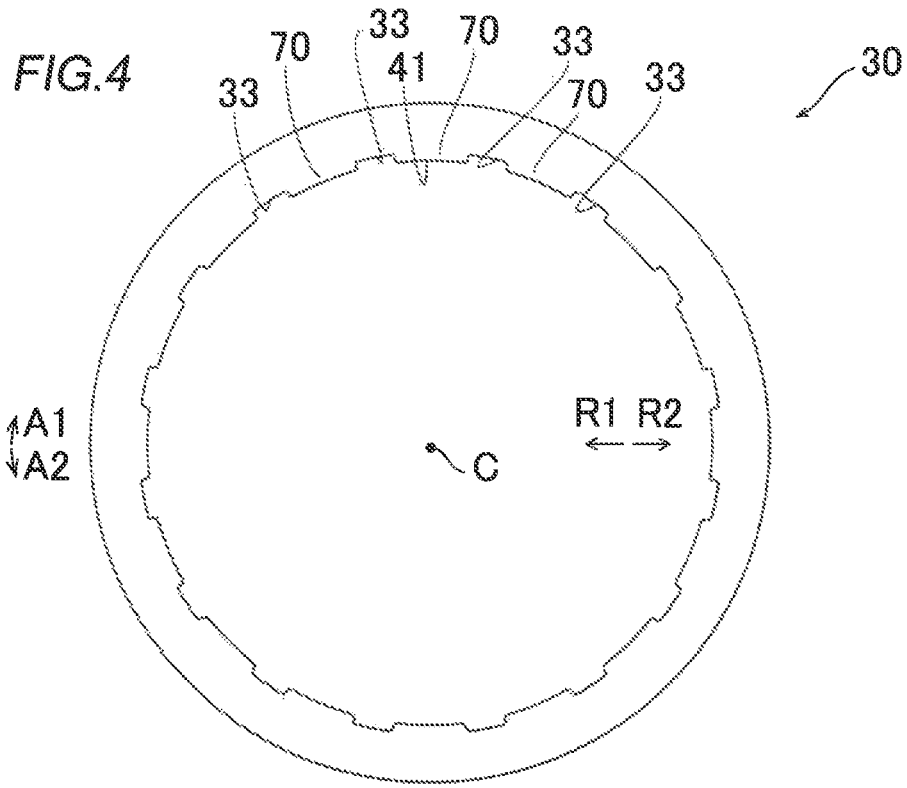
FIG. 4 is a view of an end plate according to the embodiment of the present disclosure as viewed in the rotational axis direction.

As illustrated in FIG. 1, the end plates 30 are disposed on one side (core end face 25a) and the other side (core end face 25b) of the rotor core 20 in the rotational axis direction. The two end plates 30 are disposed so as to sandwich the rotor core 20 from both sides in the rotational axis direction. As illustrated in FIG. 4, the end plate 30 is formed in an annular shape as viewed in the rotational axis direction. An inner peripheral surface 31 of the end plate 30 is disposed nearly flush with the core inner peripheral surface 22a in the rotational axis direction.

Figure 5:
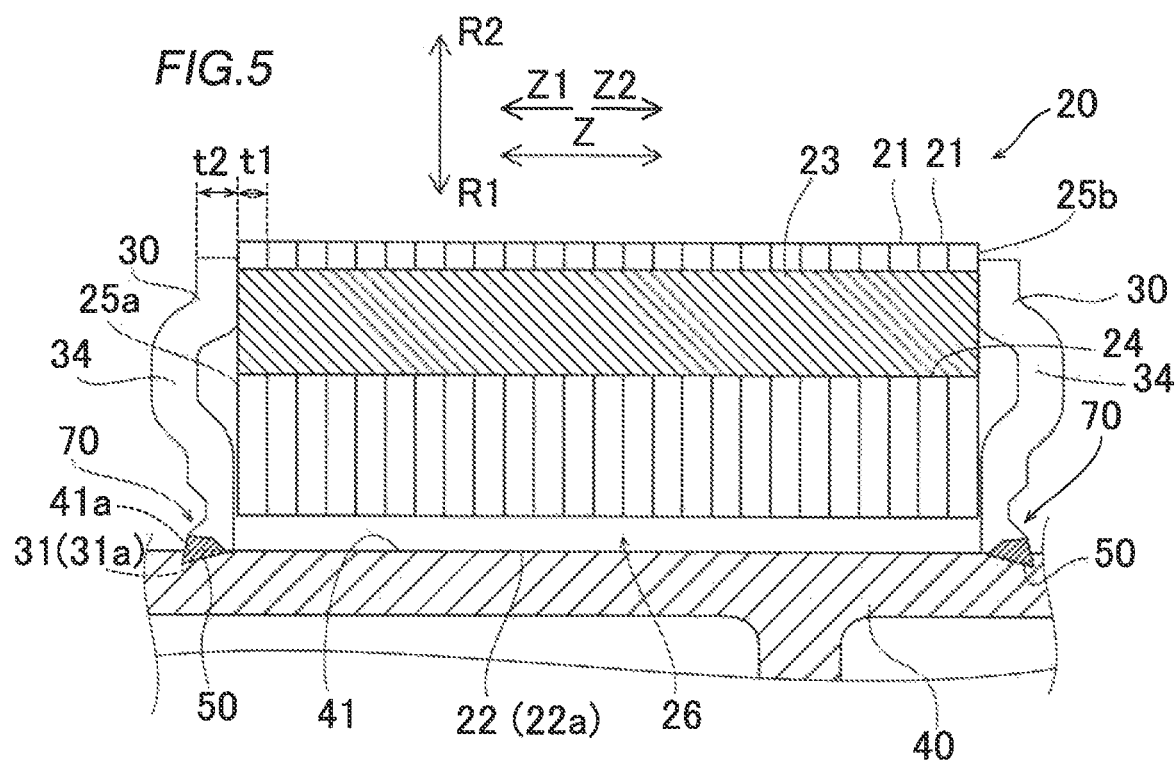
FIG. 5 is a sectional view taken along line 700-700 in FIG. 2.

As illustrated in FIG. 5, each of the end plates 30 is disposed such that the inner peripheral surface 31 of the end plate 30 faces the outer peripheral surface 41 of the hub member 40 in the radial direction. Plate-side joining end faces 31a of the inner peripheral surface 31 of the end plate 30 and hub-side joining end faces 41a of the outer peripheral surface 41 of the hub member 40 are welded at the first welded portion 50 and thus, the end plate 30 and the hub member 40 are fixed to each other.

Figure 6:
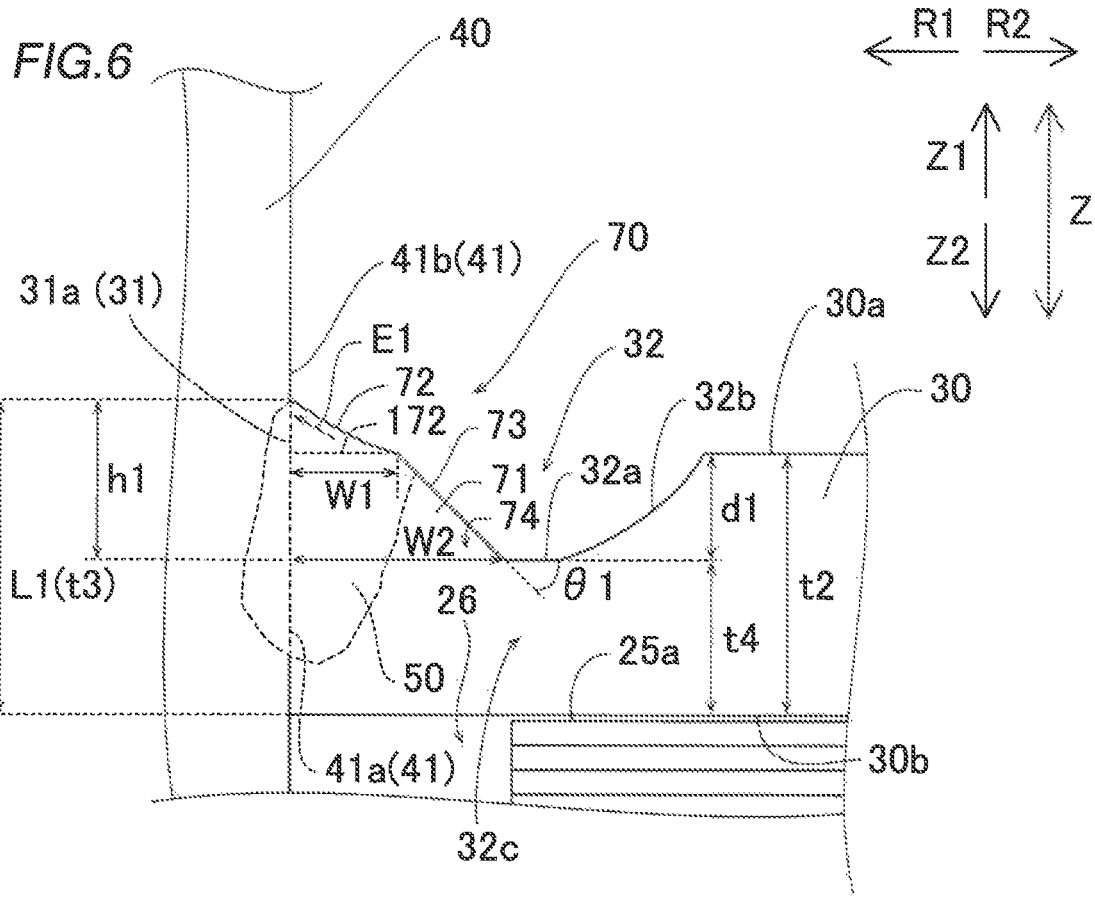
FIG. 6 is a cross-sectional view of a configuration of a protrusion and a first welded portion according to the embodiment of the present disclosure.

A thickness t2 of the end plate 30 is larger than a thickness t1 of the electromagnetic steel sheet 21 in the rotational axis direction. As illustrated in FIG. 6, the thickness t2 of the end plate 30 means the length from an end face 30a to an end face 30b, and is described so as to mean the thickness in the rotational axis direction excluding the thickness t4 of a bottom plate portion 32c.

<Configuration of Protrusion>

Figure 7:
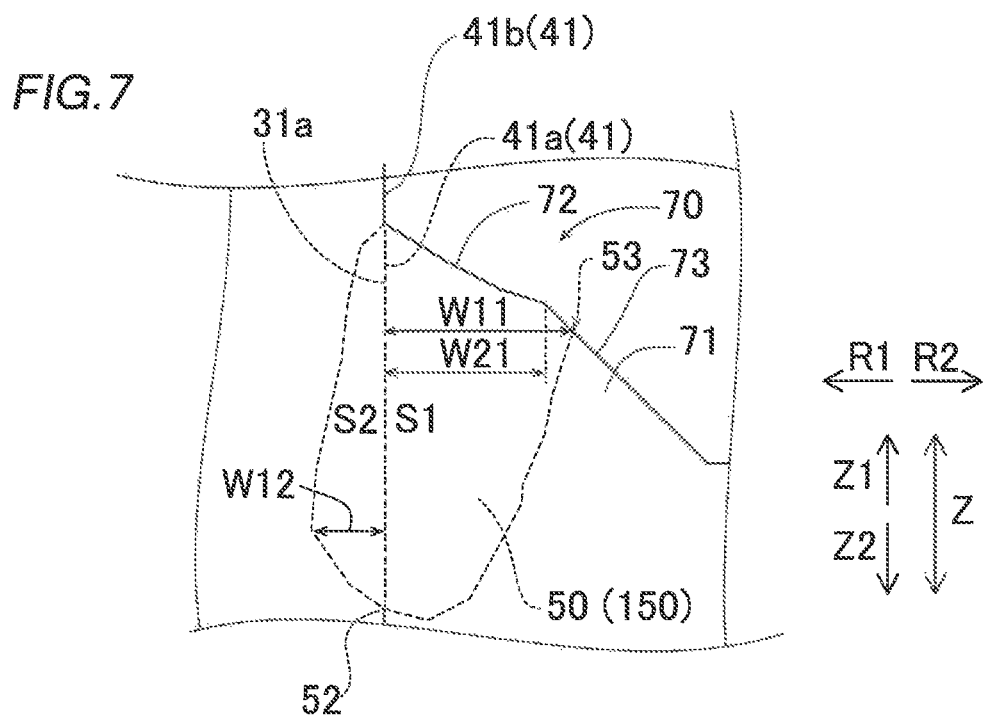
FIG. 7 is an enlarged partial view of the first welded portion in FIG. 6.

As illustrated in FIGS. 6 and 7, in the present embodiment, the end plate 30 includes projected portions 70 that are each provided adjacent to and radially outward of the plate-side joining end face 31a of the inner peripheral surface 31; that are each projected from a bottom face 32a of a depressed portion 32, which is an end face of the end plate 30 in the rotational axis direction, toward a direction (arrow Z1 direction) away from the rotor core 20 out of the rotational axis direction; and that each have a part of the first welded portion 50 and a non-melted portion 71, which is a part that is not melted. The projected portion 70 is formed between the depressed portion 32 and the plate-side joining end face 31a in the radial direction. The "part that is not melted (non-melted portion 71)" is not limited to a part in which there is no structural change when welded, and means a broad concept including heat-affected zones in which there is structural change due to welding heat. The plate-side joining end faces 31a are an example of an "inner wall surface" in the claims.

Since the configuration of the end plate 30 disposed on the core end face 25a (arrow Z1 direction side) is similar to the end plate 30 disposed on the core end face 25b (arrow Z2 direction side) as illustrated in FIG. 5, in the following description, only the end plate 30 disposed on the core end face 25a will be described and the description of the end plate 30 disposed on the core end face 25b will be omitted.

As illustrated in FIG. 6, the projected portion 70 includes a top surface 72 that is a surface in the projecting direction (arrow Z1 direction side), the plate-side joining end face 31a, and an inclined surface 73. Here, in the present embodiment, the top surface 72 of the projected portion 70 is formed so as to be inclined radially inward (toward the hub member 40) (in the arrow E1 direction) as the top surface 72 extends toward a direction away from the rotor core 20 out of the rotational axis direction. That is, a projected height h1 (a thickness t3 of the end plate 30) of the projected portion 70 in the rotational axis direction is larger on the hub member 40 side and smaller on the opposite side (depressed portion 32 side) of the projected portion 70 from the hub member 40. The projected height h1 of the projected portion 70 is a length from the bottom face 32a to the top surface 72. In FIG. 6, the projected height h1 indicates a projected height of a part in which the projected height is the maximum (for example, the position near the plate-side joining end face 31a). The thickness t3 means a length from the end face 30a of the end plate 30 on the rotor core 20 side to the top surface 72.

Here, a top surface 172 (dotted line), which is the top surface 72 before the first welded portion 50 is formed, is formed as a flat surface orthogonal to the rotational axis direction. The top surface 72 is formed by deforming (providing excess weld material on) the top surface 172 when the first welded portion 50 is formed so that the top surface 172 rises to the arrow Z1 direction side. That is, a weld bead (weld mark) is formed on the top surface 72.

The plate-side joining end face 31a forms a part of the inner peripheral surface 31 of the end plate 30 along the rotational axis direction before the first welded portion 50 is formed. Within the first welded portion 50, a part of the plate-side joining end face 31a is included (dotted line part), when the rotor 100 is completed. A length L1 of the plate-side joining end face 31a in the rotational axis direction is equal to the thickness t3. Although the expression "end face" is used for the description, the plate-side joining end face 31a also means a state (dotted line part) where a part of the plate-side joining end face 31a is included within the first welded portion 50, as described above.

Here, in the present embodiment, the inclined surface 73 is formed to be continuous with the top surface 72 of the projected portion 70 and the bottom face 32a of the depressed portion 32, and is configured to be inclined radially outward (in the direction away from the hub member 40) with respect to the rotational axis direction, from the top surface 72 to the bottom face 32a. That is, a width W1 of the top surface 72 in the radial direction is smaller than a width W2 of a root portion 74 of the projected portion 70 in the radial direction.

Here, it is preferable that an inclination angle θ1 of the inclined surface 73 be 30 degrees or more and 60 degrees or less (for example, 40 degrees or more and 50 degrees or less) with respect to a plane orthogonal to the rotational axis direction. If the inclination angle of the inclined surface 73 is smaller than 30 degrees, the projected height h1 (described below) of the projected portion 70 is relatively small, or the width W2 of the root portion 74 of the projected portion 70 is relatively large, and the heat capacity of the projected portion 70 is increased. Thus, when the first welded portion 50 is formed, the input heat is easily transmitted to a radially outward part of the end plate 30. The melting ratio of the end plate 30 in the first welded portion 50 is thus decreased. If the inclination angle of the inclined surface 73 is larger than 60 degrees, when an emission position P1 of an energy beam described below is shifted from the top surface 72 to the inclined surface 73, the energy beam is scattered and reflection of the energy beam is increased and thus, the input heat amount to the projected portion 70 (first welded portion 50) is decreased. In contrast, if the inclination angle of the inclined surface 73 is set to be 30 degrees or more and 60 degrees or less, it is possible to prevent the melting ratio of the end plate 30 in the first welded portion 50 from decreasing and it is possible to prevent the input heat amount from decreasing.

Figure 8:
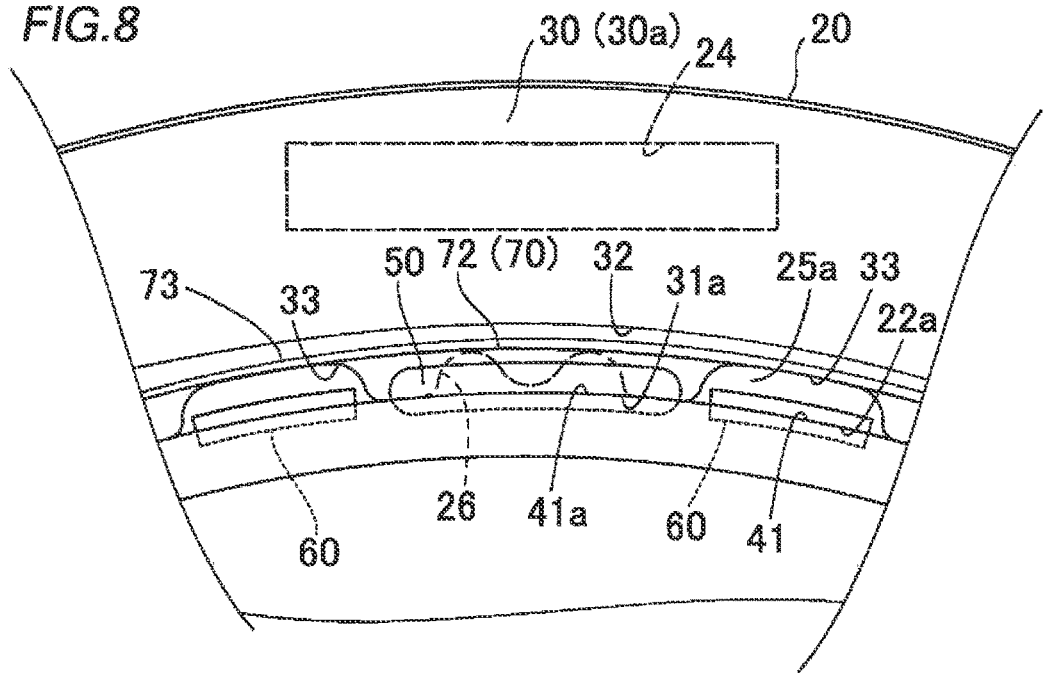
FIG. 8 is an enlarged partial view of the rotor according to the embodiment of the present disclosure as viewed in the rotational axis direction.

As illustrated in FIG. 8, the projected portion 70 is provided radially inward of the insertion hole 24 in which the permanent magnet 23 is disposed as viewed in the rotational axis direction. A part of the projected portion 70 is disposed so as to overlap with at least a part of the recessed portion 26 and at least a part of the protruded portion 27 of the rotor core 20, as viewed in the rotational axis direction.

<Structures other than Projection Portion>

As illustrated in FIG. 6, the depressed portion 32 includes the inclined surface 73, the bottom face 32*a*, and a radially outward inclined surface 32*b*. The bottom face 32*a* is configured as, for example, a flat surface orthogonal to the rotational axis direction. The radially outward inclined surface 32*b* is formed so as to connect the bottom face 32*a* and the end face 30*a* of the end plate 30 on the arrow Z1 direction side. The radially outward inclined surface 32*b* is formed as an arcuate or linear inclined surface that is inclined radially outward toward the arrow Z1 direction. A depression depth d1 of the depressed portion 32 corresponds to the magnitude of the displacement of the position in the rotational axis direction between the bottom face 32*a* and the end face 30*a*.

As illustrated in FIG. 8, in the present embodiment, the end plate 30 has clearance portions 33 that are each depressed radially outward from the plate-side joining end face 31*a* at a position adjacent to the projected portion 70 in the circumferential direction, as viewed in the rotational axis direction (arrow Z2 direction). Specifically, the clearance portions 33 are each configured as a recessed portion that is depressed radially outward, and a part of the core end face 25*a* (part of the core end face 25*b*) and each second welded portion 60 are exposed via the clearance portion 33, as viewed from the outside in the rotational axis direction. The clearance portions 33 are an example of a "core welding clearance portion" in the claims.

Each of the clearance portions 33 is disposed so as to be sandwiched from both sides by the projected portions 70 in the circumferential direction. Thus, in the projected portion 70, the heat capacity is further reduced when the first welded portion 50 is formed.

As illustrated in FIG. 5, the end plates 30 are each provided with a bent portion 34 that is provided radially outward of the depressed portion 32 and that is bent and projected toward the outside in the rotational axis direction (direction away from the rotor core 20).

(Configuration of Hub Member)

In the present embodiment, the hub member 40 is composed of a martensitic material. Specifically, the hub member 40 is composed of carbon steel of a martensitic material (for example, S25C or S35C prescribed by JIS). It is preferable that S25C be adopted as the hub member 40. Here, S25C has a relatively small carbon component and is relatively easy to weld.

As illustrated in FIG. 1, the hub member 40 is connected to a shaft member 40*a*, and is configured to transmit rotational motion between the rotor core 20 and the shaft member 40*a*, and between the end plates 30 and the shaft member 40*a*.

As illustrated in FIG. 8, the hub member 40 is configured to have a cylindrical shape, and the outer peripheral surface 41 is provided with the first welded portions 50 and the second welded portions 60. The outer peripheral surface 41 is provided with the hub-side joining end faces 41*a* that each face the plate-side joining end face 31*a* in the radial directions. A part of each hub-side joining end face 41*a* is integrated with a part of the plate-side joining end face 31*a* in a state where the first welded portion 50 is formed (see FIG. 6). That is, there is no boundary between the hub-side joining end face 41*a* and the plate-side joining end face 31*a*. The outer peripheral surface 41 is an example of an "outer diameter surface of the rotation transmitting member" in the claims. The hub-side joining end faces 41*a* are an example of a "facing surface that faces the inner wall surface" in the claims.

As illustrated in FIG. 6, in the present embodiment, the hub member 40 is provided with a heat releasing portion 41*b* that configures a part of the outer peripheral surface 41 of the hub member 40 and that is formed so as to be continuously in flush with the hub-side joining end faces 41*a* in a direction away from the rotor core 20 (toward the arrow Z1 direction) out of the rotational axis direction.

(Configuration of First Welded Portion: Configuration of Welded Portion Between End Plate and Hub Member)

As illustrated in FIG. 5, the first welded portions 50 are provided on both sides of the rotor 100 in the Z direction. For example, as illustrated in FIG. 2, the plurality of first welded portions 50 are provided at regular angular intervals in the circumferential direction. As illustrated in FIG. 8, the first welded portion 50 is provided radially inward of the insertion hole 24 in which the permanent magnet 23 is disposed, as viewed in the rotational axis direction. In addition, a part of the first welded portion 50 is disposed so as to overlap with at least a part of the recessed portion 26 and at least a part of the protruded portion 27 of the rotor core 20, as viewed in the rotational axis direction.

As illustrated in FIG. 5, the first welded portion 50 is formed across from the projected portion 70 of the end plate 30 to the hub member 40 via the plate-side joining end face 31*a* and the hub-side joining end face 41*a*. Since the first welded portions 50 provided on both sides in the Z direction have the same configuration, one (the first welded portion 50 on the arrow Z1 direction side) will be described below, and description of the other (the first welded portion 50 on the arrow Z2 direction side) will be omitted.

As illustrated in FIG. 7, the shape of the radial cross section of the first welded portion 50 corresponds to the shape of a melted portion 150 when the end plate 30 and the hub member 40 are welded. The first welded portion 50 means a part that is formed by solidifying after a melted part of the end plate 30 and a melted part of the hub member 40 are mixed. That is, it is described that the heat-affected portion generated when forming the first welded portion 50 is not included in the first welded portion 50. The heat-affected zone configures a part of the non-melted portion 71 of the projected portion 70.

Here, in the first welded portion 50, the melting ratio r of the end plate 30 is configured to be 40% or more and 80% or less. Specifically, in the first welded portion 50, when the hub member 40 is formed of S25C and the end plate 30 is formed of SUS304, the first welded portion 50 is configured such that the melting ratio r of SUS304 is 40% or more and 80% or less. It is more preferable that the melting ratio r of SUS304 be larger than the melting ratio of S25C. When the end plate 30 is composed of SUS309, it is preferable that the melting ratio r be 20% or more and 80% or less.

Specifically, in the present embodiment, when the melted area of the end plate 30 in the radial cross section of the first welded portion 50 is S1 and the melted area of the hub member 40 is S2, the melted area S1 of the end plate 30 is 40% or more and 80% or less of the entire the first welded portion 50 (S1+S2). As in the example of FIG. 7, it is more preferable that the melted area S1 is larger than the melted area S2.

The melted area S1 means an area of a part of the first welded portion 50, the part being radially outward of the plate-side joining end face 31a (hub-side joining end face 41a). Further, the melted area S2 means an area of a part of the first welded portion 50, the part being radially inward of the hub-side joining end face 41a (plate-side joining end face 31a) of the first welded portion 50.

The first welded portion 50 is formed so as to have a tapered shape toward the tip end portion S2 on the hub member 40 side. In the direction (arrow Z2 direction) toward the rotor core 20 out of the rotational axis direction, the first welded portion 50 has the following: a part of the end plate 30 in which a width W11 gradually becomes smaller, the width W11 being in the direction (arrow R2 direction) orthogonal to the plate-side joining end face 31a (hub-side joining end face surface 41a) of the first welded portion 50; and a part of the hub member 40 in which a width W12 gradually becomes larger, the width W12 being in the direction (arrow R1 direction) orthogonal to the plate-side joining end face 31a (hub-side joining end face 41a) of the first welded portion 50. The maximum dimension of the width W11 is larger than the maximum dimension of the width W12. The rotational axis direction position at which the width W11 is the maximum is positioned on the projecting direction side (arrow Z1 direction side) of the projected portion 70, with respect to the rotational axis direction position at which the width W12 becomes the maximum.

The projected portion 70 is provided with a boundary portion 53 between the first welded portion 50 and the non-melted portion 71. For example, the boundary portion 53 is provided on the inclined surface 73. That is, in the projected portion 70, radially inward of the boundary portion 53 is the first welded portion 50 and radially outward of the boundary portion 53 is the non-melted portion 71.

As seen in FIG. 8, at least a part of the first welded portion 50 (part on the end plate 30 side) is formed at a position where the part overlaps with the recessed portions 26 in the rotational axis direction, as viewed in the rotational axis direction. As a result, the heat capacity of the projected portion 70 becomes smaller, corresponding to the heat being not easily transmitted to the rotor core 20. In addition, it is possible to prevent the rotor core 20 from being heat-affected (deformed, distorted, and the like) due to the heat that is generated when forming the first welded portion 50.

(Structure of Second Welded Portion: Structure of Welded Portion Between Rotor Core and Hub Member)

As illustrated in FIG. 1, a plurality of the second welded portions 60 are provided on both sides of the rotor 100 in the Z direction. That is, the second welded portions 60 are formed on the core end faces 25a and 25b of the rotor core 20, across the core inner peripheral surface 22a of the through whole 22 of the rotor core 20 and the outer peripheral surface 41 of the hub member 40.

The cross section along the radial direction of the second welded portions 60 has a shape tapered toward the inside of the rotor core 20 in the rotational axis direction, and is formed in a generally triangular shape. The second welded portions 60 are formed across a plurality of the electromagnetic steel sheets 21.

As illustrated in FIG. 2, the second welded portions 60 are provided so as to be spaced away from each other in the circumferential direction. The first welded portions 50 and the second welded portions 60 are provided at generally the same radial position. The second welded portions 60 are disposed at positions in the circumferential direction corresponding to positions between the permanent magnets 23 (insertion holes 24) in the circumferential direction. The first welded portions 50 are each disposed between two adjacent second welded portions 60 in the circumferential direction. The second welded portions 60 provided on the core end face 25a of the rotor core 20 are formed so as to be exposed via the clearance portions 33 as viewed from the arrow Z1 direction. The second welded portions 60 provided on the core end face 25b of the rotor core 20 are formed so as to be exposed via the clearance portions 33 as viewed from the arrow Z2 direction.

[Manufacturing Method of Rotor]

Figure 9:
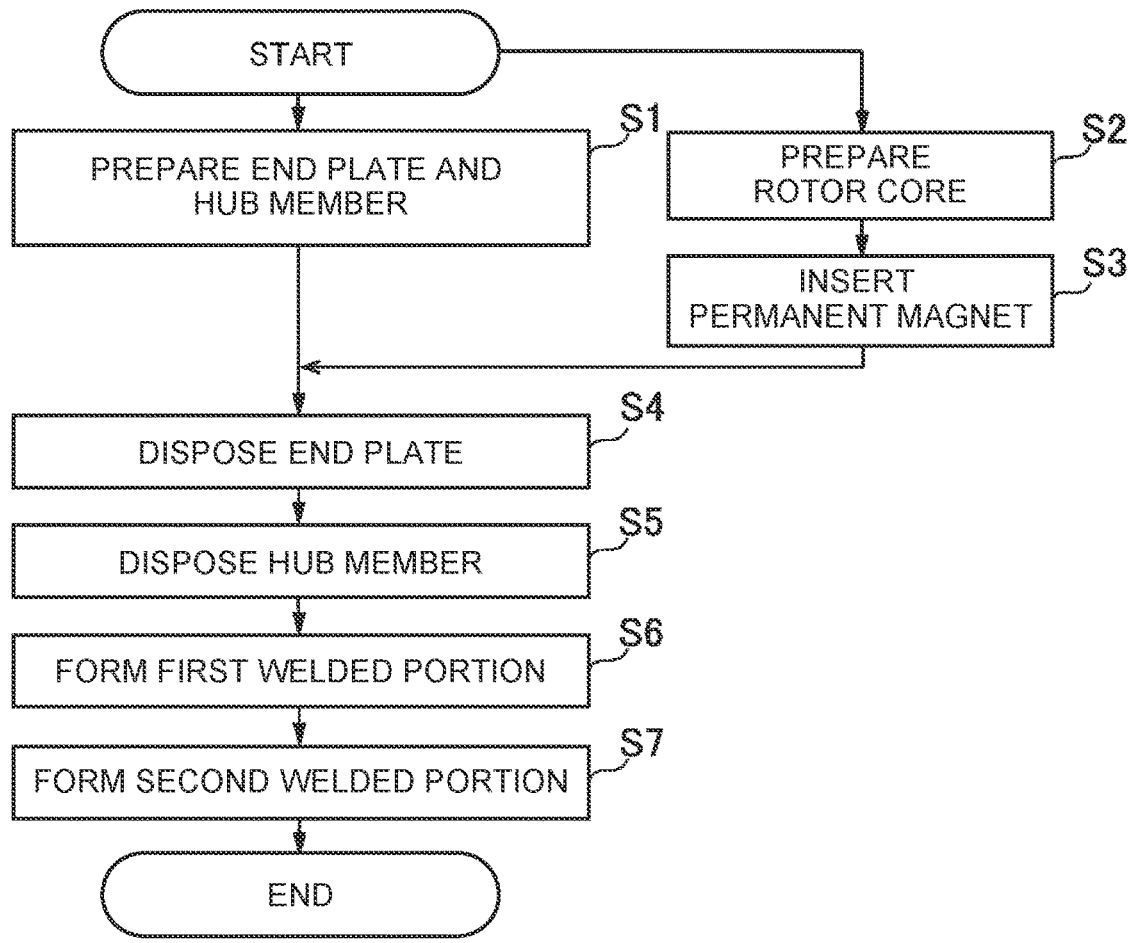
FIG. 9 is a flowchart of a manufacturing process of the rotor according to the embodiment of the present disclosure.

Next, a manufacturing method of the rotor 100 according to the first embodiment will be described. FIG. 9 illustrates a flowchart of a manufacturing process of the rotor 100.

(Step of Preparing End Plate and Hub Member)

First, in step S1 (see FIG. 9), the end plate 30 and the hub member 40 are prepared. That is, in the present embodiment, the end plate 30 that is configured of an austenitic material is prepared. Here, the end plate 30 has the projected portions 70 that are each provided adjacent the plate-side joining end face 31a in the radial direction and that are each projected from the bottom face 32a of the depressed portion 32, which is an end face in the rotational axis direction, in the direction away from the rotor core 20 out of the rotational axis direction.

Figure 10:
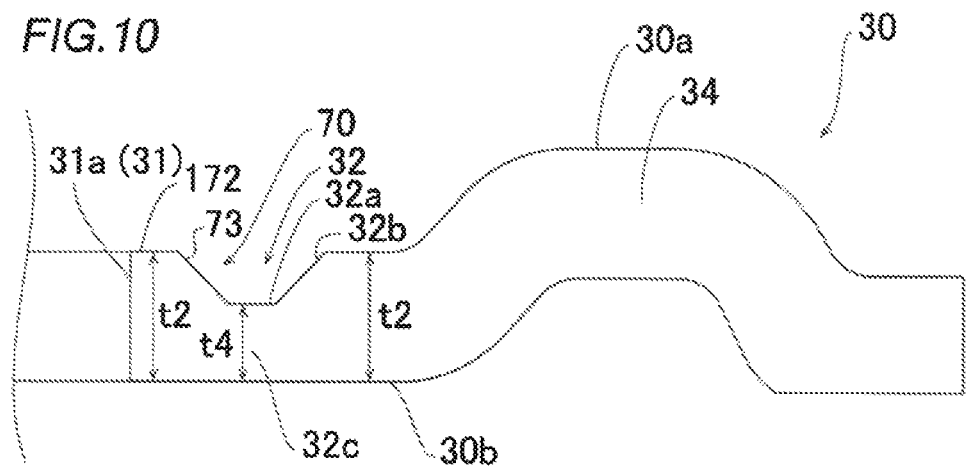
FIG. 10 is a diagram for describing a step of preparing the end plate according to the embodiment of the present disclosure.

Specifically, a steel plate of austenitic stainless steel (preferably, SUS304 or SUS309) serving as an austenitic material having the thickness t2 is prepared. Then, as illustrated in FIG. 10, the depressed portion 32 composed of the inclined surface 73, the bottom face 32a, and the radially outward inclined surface 32b is formed on the steel plate by a machining or a press working performed with a working device (a press working device, a machining center, and the like). A through hole is formed in the steel plate and the inner peripheral surface 31 (plate-side joining end faces 31a) is formed. As a result, the projected portions 70 are formed radially inward of the steel plate.

More specifically, the inclined surface 73 is formed on the steel plate so as to be continuous with the top surfaces 172 of the projected portions 70 and the bottom face 32a of the depressed portion 32. In addition, the inclined surface 73 is inclined radially outward (in the direction away from the hub member 40) from the top surface 172 with respect to the rotational axis direction. Then, by forming the depressed portion 32 in the steel plate, the projected portions 70 are each formed between the depressed portion 32 and the plate-side joining end face 31a in the radial direction, the projected portions 70 projecting from the bottom face 32a of the depressed portion 32 in the direction away from the rotor core 20 out of the rotational axis direction.

Here, each of the top surfaces 172 is formed as a flat surface that is orthogonal to the plate-side joining end face 31a. The top surface 172 becomes the top surface 72 with the formation of the first welded portion 50 thereon. In addition, the bent portion 34 (see FIG. 10) is formed by the press working device.

As illustrated in FIG. 4, the clearance portions 33, which are depressed radially outward from the plate-side joining end faces 31a, are each formed on the steel plate at a position adjacent to the projected portion 70 in the circumferential direction by a press working device or a machining device. The bent portion 34 (see FIG. 10) is formed by the press working device and the end plate 30 is formed (prepared).

As illustrated in FIG. 1, the hub member 40 composed of a martensitic material is prepared. Specifically, the hub member 40 composed of carbon steel (for example, S25C or S35C) serving as a martensitic material is prepared. The hub member 40 is prepared, which includes the outer peripheral surface 41 that is formed to have a cylindrical shape, that has the hub-side joining end faces 41a, and that is provided with the heat releasing portions 41b (see FIG. 6) formed to be flush with (having the same radial position as) the hub-side joining end faces 41a and continuous toward the outer side in the rotational axis direction.

(Step of Preparing Rotor Core)

In step S2, the rotor core 20 is formed (prepared). Specifically, the magnetic steel plates 21 are punched from a strip-shaped magnetic steel plate by a press working device. As illustrated in FIG. 3, the electromagnetic steel plates 21 each having an annular shape are stacked in the rotational axis rotation that is the extending direction of the rotational axis. In this way, the cylindrical electromagnetic steel plates 21 are formed, the electromagnetic steel plates 21 being rotated around the rotational axis and having the through hole 22 with the rotational axis C as the center.

Then, the stacked electromagnetic steel sheets 21 are welded. Specifically, the protruded portions 27 of the magnetic steel sheets 21 are melted by inputting heat to the top portion of the protruded portions 27. When the melted part solidifies, the core forming welded portions 28 are formed in the protruded portions 27. In this way, the rotor core 20 is formed (prepared). Welding is performed, for example, by emitting a high-energy beam (laser or electron beam) from a heat source device 200 (see FIG. 12) so as to input heat to the protruded portions 27.

(Step of Inserting Permanent Magnet)

In step S3, the permanent magnet 23 is inserted in each of the insertion holes 24 of the rotor core 20. For example, the permanent magnet 23 is inserted into the insertion hole 24 by moving the permanent magnet 23 in the rotational axis direction with respect to the rotor core 20.

(Step of Disposing End Plate)

Figure 11:
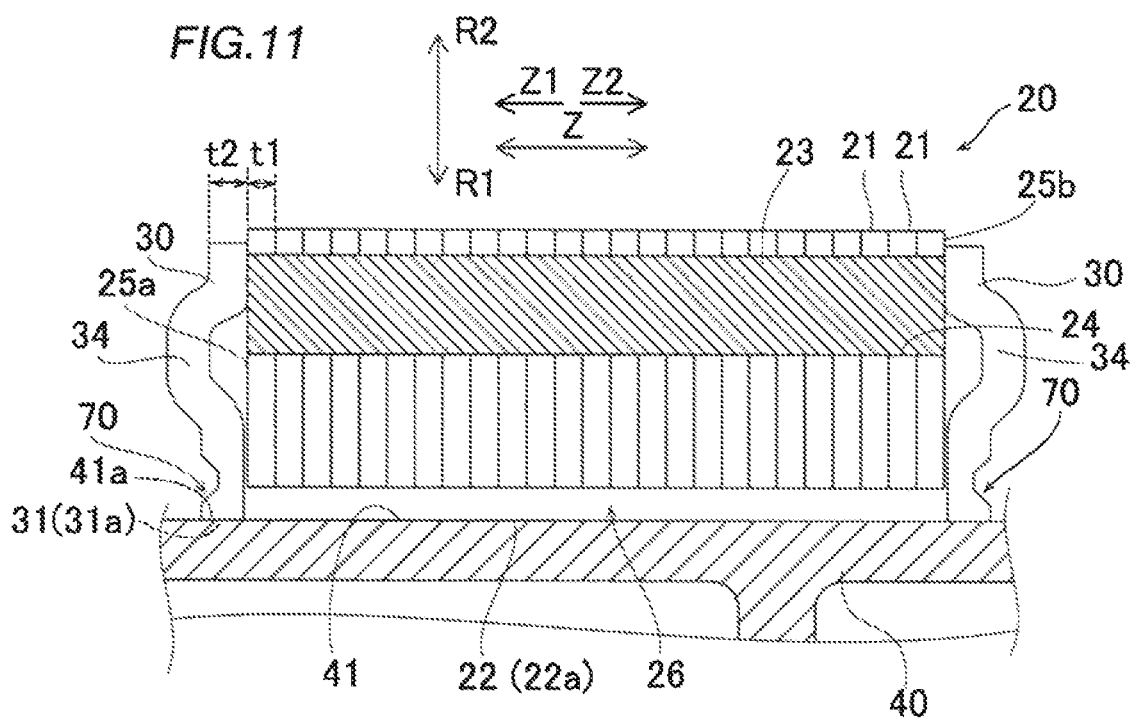
FIG. 11 is a diagram for describing a step of disposing the end plate and a step of disposing a hub member of the embodiment of the present disclosure.

As illustrated in FIG. 11, in step S4, the end plate 30 is disposed on each of the core end face 25a and the core end face 25b that are the end portions of the rotor core 20 in the rotational axis direction, the end plate 30 having the inner peripheral surface 31 (through hole) with the rotational axis C as the center. At this time, as viewed from the outside in the rotational axis direction, a part of the core end face 25a or a part of the core end face 25b is exposed via the clearance portions 33 of the end plate 30 (see FIG. 8). The core end faces 25a and 25b are covered by a part other than the clearance portions 33 of the end plate 30.

(Step of Disposing Hub Member)

As illustrated in FIG. 11, in step S5, the hub member 40 is disposed on the inner peripheral surface 31 (plate-side joining end faces 31a) of the end plate 30. Specifically, the hub member 40 is disposed so that the outer peripheral surface 41 of the hub member 40 faces in the radial direction, the inner peripheral surface 31 (plate-side joining end faces 31a), which is formed as the through hole, and the through hole 22 of the rotor core 20. For example, the hub member 40, the end plate 30, and the rotor core 20 are relatively moved in the rotational axis direction.

(Step of Forming First Welded Portion)

Figures 12, 13, 14:
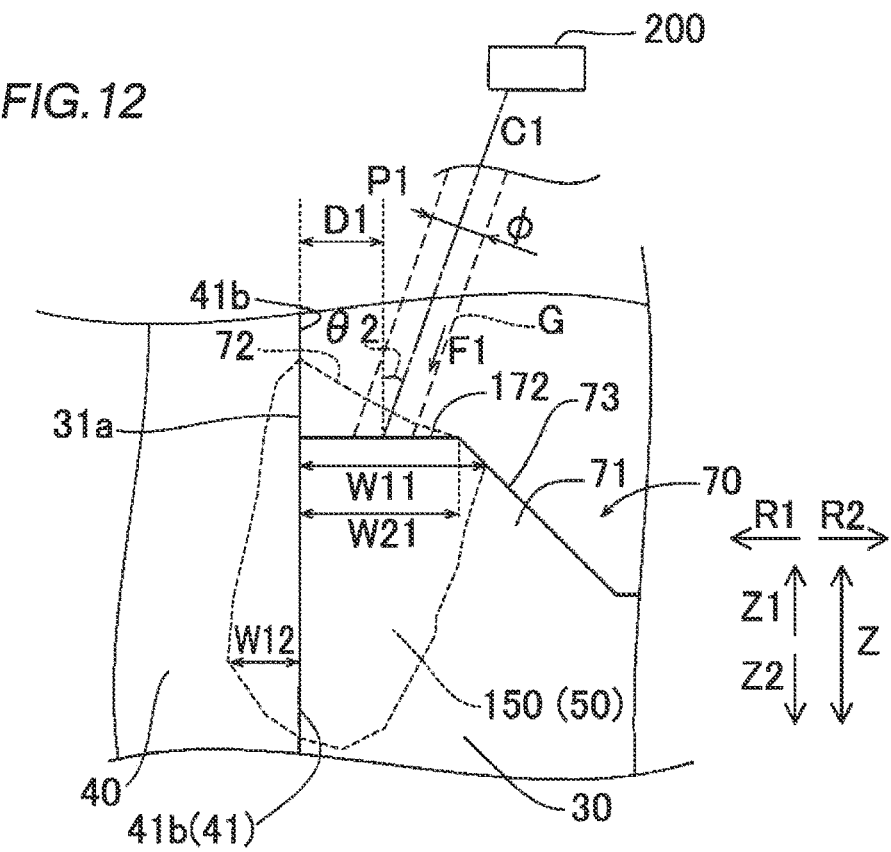
FIG. 12 is a diagram for describing a step of forming the first welded portion according to the embodiment of the present disclosure.
FIG. 13 is a diagram for describing a comparison result between a forming method of a first welded portion according to a comparative example and the forming method of a first welded portion according to the embodiment of the present disclosure.
FIG. 14 is a diagram of an evaluation result of joining strength regarding a melting ratio of the first welded portion according to the embodiment of the present disclosure.

As illustrated in FIG. 12, in the present embodiment, in step S6, at least a part of the projected portion 70 is melted so that the first welded portion 50 is formed across the projected portion 70 of the end plate 30, the plate-side joining end faces 31a, and the hub member 40. For example, a part of the hub member 40 composed of carbon steel serving as a martensitic material and at least a part of the projected portion 70, which is composed of austenitic stainless steel serving as an austenitic material, of the end plate 30 are melted so that the first welded portion 50 is formed.

Specifically, the high-energy beam G (hereinafter referred to as the "beam G") is emitted on the top surface 172 of the projected portion 70 in the rotational axis direction by the heat source device 200 so that at least a part of the projected portion 70 is melted so as to form the melted portion 150 extending from the projected portion 70 to the hub member 40. Then, the melted part is solidified to form the first welded portion 50. It is preferable that the beam G be a laser beam and the heat source device 200 be a light source device. The heat source device 200 is configured to perform keyhole welding for forming a keyhole, when forming the melted portion 150.

More specifically, the heat source device 200 emits the beam G on the top surface 172 so that a beam center C1 of the beam G is positioned at a position P1 offset radially outward (to the end plate 30 side) from the plate-side joining end face 31a by a distance D1 (offset amount D1), and so that an emission direction F1 of the beam G is inclined radially inward (toward the hub member 40) from the radially outer side with respect to the rotational axis C direction. For example, the emission direction F1 is set to an inclination angle of 15 to 20 degrees with respect to the rotational axis C. In this way, as illustrated in FIG. 7, in the present embodiment, the melted portion 150 is formed so that the width W11 of the melted portion 150 of the end plate 30 in the direction orthogonal to the plate-side joining end face 31a is gradually decreased, and so that the width W12 of the melted portion 150 of the hub member 40 in the direction orthogonal to the plate-side joining end face 31a is gradually increased, in the direction toward the rotor core 20 out of the rotational axis direction.

Here, the beam G is emitted on the top surface 172 of the projected portion 70 having a width W21 in the radial direction larger than a beam diameter φ of the beam G. As illustrated in FIG. 13, the width W21 is preferably 0.8×φ or more (more preferably, 2.0×φ or more). For example, the width W21 is 2.0×φ or more and 3.0φ or less.

The width W21 is larger than a dimension obtained by adding a beam diameter (φ/2) to a dimension of three halves of the offset amount D1 (D1×3/2). That is, W21>(D1×3/2)+(φ/2). Thus, the width W21 allows accepting the magnitude of the error of the emission position (position P1) of the beam G, and the dimensional error of the end plate 30 and the hub member 40. For example, the width W21 of top surface 172 and the width W1 of the top surface 72 are the same.

The beam G is emitted on the top surface 172 that is formed as a flat surface orthogonal to the plate-side joining end face 31a. Thus, the top surface 172 is deformed into the top surface 72 so that the top surface 172 is inclined radially inward (toward the hub member 40) in a direction away from the rotor core 20 out of the rotational axis direction.

In the present embodiment, a part of the hub member 40 composed of S25C serving as a martensitic material and at least a part of the projected portion 70 of the end plate 30 composed of SUS304 serving as an austenitic material are melted. Thus, the first welded portion 50 is formed so that the melted area S1 of the end plate 30 in the radial section (see FIG. 7) of the first welded portion 50 is 40% or more and 80% or less of the radial section.

In the present embodiment, the heat input to the projected portion 70 is transmitted to the heat releasing portion 41b.

Here, the heat releasing portion 41b is formed to be continuous and in flush with the hub-side joining end faces 41a of the outer peripheral surface 41 that faces the inner peripheral surface 31 of the end plate 30, toward the direction away from the rotor core 20 out of the rotational axis direction. In this way, the heat in the hub member 40 is transmitted to the heat releasing portion 41b.

As illustrated in FIG. 8, the first welded portion 50 is formed with the projected portion 70 and the recessed portions 26 overlapped, as viewed in the rotational axis direction.

(Step of Forming Second Welded Portion)

In step S7, the second welded portions 60 are formed. In the present embodiment, as illustrated in FIG. 8, the second welded portion 60 is formed by melting the rotor core 20 and the hub member 40, while a part of the core end face 25a or a part of the core end face 25b of the rotor core 20 is exposed via the clearance portion 33, in the direction away from the rotor core 20 out of the rotational axis direction (outward in the rotational axis direction).

Specifically, the beam G is emitted on the core end faces 25a and 25b exposed via the clearance portion 33. In this way, the second welded portion 60 is formed so as to sandwich the first welded portion 50 in the circumferential direction so that the radial position is generally the same as that of the first welded portion 50. The beam G is emitted by the heat source device 200 that forms the first welded portion 50. Then, when the rotor 100 is completed and combined with the stator 10, the rotating electrical machine 101 is completed.

[Comparison Result of Formation of First Welded Portion]

As illustrated in FIG. 13, a description will be provided of a comparison result of a first welded portion forming method according to a comparative example in which a hub member and an end plate that is not provided with projected portions are welded to form the first welded portions, and the first welded portion 50 forming method according to the present embodiment. The first welded portion forming method (in particular, setting the offset amount) according to the comparative example does not indicate a conventional technique, but is an example for showing the effects of the present embodiment.

Evaluation was performed for the welded part of the first welded portion according to the comparative example in which the offset amount D1 of the beam G is set to 0 (no offset), 0.4×φ, 0.8×φ, 1.2×φ, and 1.6×φ, and the welded part of the first welded portion 50 according to the present embodiment. For the first welded portions 50 according to the present embodiment, evaluation was performed for the cases where the width W21 of the top surface 172 is set to 0.8×φ and 2.0×φ. The evaluation "○" means that joining strength is ensured and that low-temperature cracking or non-welding has not occurred, and the evaluation "×" means that joining strength is not easily ensured (low temperature cracking or non-welding has occurred).

As a result of the evaluation, in the comparative example, the evaluation is as follows: "×" when the offset amount D1 is 0; "×" when 0.4×φ; "○" when 0.8×φ; "○" when 1.2×φ; and "×" when 1.6×φ.

When the width W21 of the present embodiment is 0.8×φ, the evaluation is as follows: "○" when the offset amount D1 is 0; "○" when 0.4×φ; "○" when 0.8×φ; "×" when 1.2×φ; and "×" when 1.6×φ. When the width W21 of the present embodiment is 2.0×φ, the evaluation is as follows: "○" when the offset amount D1 is 0; "○" when 0.4×φ; "○" when 0.8×φ; "○" when 1.2×φ; and "×" when 1.6×φ.

As a result of comparison between the comparative example and the present embodiment, it is found that in the comparative example, joining strength can be ensured when the offset amount D1 is 0.8×φ or more and 1.2×φ or less, and in contrast, in the present embodiment, joining strength can be ensured when the offset amount D1 is 0 or more and 0.8×φ or less (1.2×φ when W21 is 2.0×φ, which is a wider range than the comparative example. That is, it has been found that compared to the comparative example, the present embodiment has a wider allowable range for an error of the offset amount D1 (the emission position error of the beam G or the dimensional error of the end plate 30).

As a result of comparing the case where the width W21 of the present embodiment is 0.8×φ and the case where the width W21 of the present embodiment is 2.0×φ, the range of the offset amount D1 is wider in the case of 2.0×φ. That is, it has been found that when the width W21 of the present embodiment is 2.0×φ, the allowable range of the offset amount D1 becomes wider.

[Evaluation Result of Melting Ratio of First Welded Portion]

With reference to FIG. 14, a description will be given regarding a result of changing the melting ratio r (melting ratio r of SUS304) of the end plate 30 and evaluating the welded part of the first welded portion 50 according to the present embodiment. The hub member 40 used was composed of S25C.

As a result of the evaluation, low-temperature cracking ("×") occurs when the melting ratio r is 30%, as illustrated in FIG. 14. It was found that joining strength of the first welded portion 50 can be ensured ("○") in a range where the melting ratio r is 40% or more and 80% or less. It was also found that non-welding ("×") occurs when the melting ratio r is 90%.

As a result, it was found that joining strength of the first welded portion 50 can be surely ensured when SUS304 is used as the end plate 30 and S25C is used as the hub member 40, and when the melting ratio r is 40% or more and 80% or less.

[Effects of Manufacturing Method of Present Embodiment]

In the manufacturing method according to the present embodiment, the following effects can be obtained.

In the above embodiment, as described above, the welded portion (50) is formed across the projected portion (70) of the plate (30) and the rotation transmitting member (40) by melting at least part of the projected portion (70). In this way, the heat capacity of the projected portion (70) (the part of the plate (30) to be melted) can be made smaller than when the part of the plate (30) to be melted is formed as a surface that is not projected. As a result, the melting amount of the plate (30) composed of an austenitic material can be increased, compared to when the projected portion (70) is not provided. Thus, the melting ratio (r) of the austenitic material in the welded portion (50) can be increased. Therefore, it is possible to make low-temperature cracking is less likely to occur in the welded portion (50) and it is possible to ensure joining strength even when the plate (30) is welded and fixed to the rotation transmitting member (40) composed of a martensitic material. In the above embodiment, since the projected portion (70) composed of the austenitic material provided on the plate (30) beforehand can be melted, it is possible to increase the melting ratio (r) of the austenite material in the welded portion (50) without providing a device for supplying a welding wire or the like in the manufacturing equipment of the rotor (100). As a result, joining strength between the rotation transmitting member

(40) and the plate (30) can be ensured while preventing the manufacturing equipment (welding equipment) of the rotor (100) from increasing in size.

In the above embodiment, the step (S5) of disposing the rotation transmitting member (40) is the step (S5) of disposing the rotation transmitting member (40) so that an inner wall surface (31a) radially inward of the projected portion (70) faces an outer diameter surface (41a) of the rotation transmitting member (40) in the radial direction; and the step (S6) of forming the welded portion (50) is the step (S6) of forming the welded portion (50) across the inner wall surface (31a) of the projected portion (70) and the outer diameter surface (41a) of the rotation transmitting member (40). With such a configuration, the projected portion and the rotation transmitting member can be directly joined thereacross, and thus joining strength between the rotation transmitting member (40) and the plate (30) can be further ensured.

In the above embodiment, as described above, the step (S6) of forming the welded portion (50) is the step (S6) of forming the welded portion (50) by melting a part of the rotation transmitting member (40) that is formed of carbon steel serving as the martensitic material and at least a part of the projected portion (70) of the plate (30) that is formed of austenitic stainless steel serving as the austenitic material. With such a configuration, carbon steel that is generally used as a material of the rotation transmitting member (40) and austenitic stainless steel that is generally used as a material of the plate (30) can be used. As a result, it is not necessary to form the rotation transmitting member (40) and the plate (30) with a special material and thus, joining strength of the rotation transmitting member (40) and the plate (30) can be ensured while using versatile materials.

In the above embodiment, as described above, the step (S6) of forming the welded portion (50) is the step (S6) of forming the welded portion (50) by emitting the energy beam (G) on the top surface (172) of the projected portion (70) in the rotational axis direction so as to melt at least a part of the projected portion (70) so as to form the melted portion (150) extending from the projected portion (70) to the rotation transmitting member (40). With such a configuration, melting can be started from the top surface (172) of the projected portion (70) composed of austenitic material, so that the melting ratio (r) of the austenitic material of the welded portion (50) can be easily increased, unlike the case where melting is started from the rotation transmitting member (40) composed of martensitic material. Since the energy beam (G) is emitted to form the welded portion (50), the shape of the melted portion (150) to be formed can be easily controlled according to the direction in which the energy beam (G) is emitted. As a result, the shape of the welded portion (50) can be easily controlled, unlike with arc welding, which is not welding (keyhole welding) performed by emitting the energy beam (G).

In the above embodiment, as described above, the step (S6) of forming the welded portion (50) is the step (S6) of forming the welded portion (50) by emitting the energy beam (G) on the top surface (172) so that the beam center (C1) of the energy beam (G) is positioned at the position (P1) offset from the rotation transmitting member (40) to the plate (30) side in the radial direction and so that the emission direction of the energy beam (G) is inclined from the plate (30) side toward the rotation transmitting member (40) with respect to the rotational axis direction. With such a configuration, heat can be input while the emission position (P1) of the energy beam (G) is offset from the rotation transmitting member (40) toward the plate (30). Thus, the melting ratio (r) of the austenitic material in the welded portion (50) can be further increased. Further, by inclining the emission direction of the energy beam (G) from the plate (30) side in the radial direction toward the rotation transmitting member (40) in the radial direction, it is possible to easily form the melted portion (150) extending from the plate (30) to the rotation transmitting member (40), even when the emission position (P1) of the energy beam (G) is offset.

In the above embodiment, as described above, the step (S6) of forming the welded portion (50) is the step (S6) of forming the welded portion (50) by forming the melted portion (150) so that the width (W11) of the melted portion (150) of the plate (30) in the radial direction becomes gradually smaller and the width (W12) of the melted portion (150) of the rotation transmitting member (40) in the radial direction becomes gradually larger, in the direction toward the rotor core (20) out of the rotational axis direction. With such a configuration, it is possible to increase the melting amount of the plate (30) composed of austenitic material at a position relatively far from the rotor core (20) and decrease the melting amount of the plate (30) at a position relatively close to the rotor core (20). As a result, it is possible to reduce the effect of heat on the rotor core (20) when the plate (30) is melted.

In the above embodiment, as described above, the step (S6) of forming the welded portion (50) is the step (S6) of forming the welded portion (50) by emitting the energy beam (G) on the top surface (172) of the projected portion (70) that has the width (W21) in the radial direction larger than the beam diameter (φ) of the energy beam (G). Here, if the emission position (P1) of the energy beam (G) is the side face of the projected portion (70) that is a part other than the top surface (172) of the projected portion (70) when there is an error in the emission position (P1) of the energy beam (G) or there is an error in the dimension of the plate (30) or the rotation transmitting member (40), it is conceivable that the energy beam (G) on the emission part is scattered or the reflection is increased and thus the power density in the emission part is decreased. In this case, it is conceivable that since the power density in the emission part is reduced, the melted amount of the entire welded portion (50) is reduced, and joining strength between the rotation transmitting member (40) and the plate (30) is not easily ensured. In contrast, with the above configuration, even if there is an error in the emission position (P1) of the energy beam (G) or a dimensional error in the plate (30) and the rotation transmitting member (40), it is possible to prevent the emission position (P1) of the energy beam (G) from deviating from the top surface (172) of the projected portion (70). As a result, it is possible to prevent the power density in the emission part from decreasing and thus, it is possible to surely ensure joining strength between the rotation transmitting member (40) and the plate (30).

In the above embodiment, as described above, the step (S1) (S1) of preparing the plate (30) is the step (S1) of preparing the plate (30) having the inclined surface (73) that is formed so as to be continuous with the top surface (172) of the projected portion (70) and the end face (32a) in the rotational axis direction and that is inclined from the top surface (172) in the direction away from the rotation transmitting member (40) in the radial direction with respect to the rotational axis direction. Here, in the case where the top surface (172) of the projected portion (70) and the end face (32a) in the rotational axis direction are connected by the side face extended in the rotational axis direction, when the emission position (P1) of the energy beam (G) is deviated (moved) from the top surface (172) of the projected portion

(70) to the side face, an incident angle of the energy beam (G) with respect to the side face becomes small and the reflection and scatter of the energy beam (G) on the side face is increased. In contrast, with the above configuration, even if the emission position (P1) of the energy beam (G) deviates from the top surface (172) of the projected portion (70) to the inclined surface (73), the decrease margin of the incident angle of the energy beam (G) with respect to the inclined surface (73) becomes small and thus, it is possible decrease reflection and scatter of the energy beam (G). As a result, even if there is an error in the emission position (P1) of the energy beam (G) or a dimensional error of the plate (30) and the rotation transmitting member (40), it is possible to further prevent the power density in the emission part of the energy beam (G) from being reduced.

In the above embodiment, as described above, the step (S6) of forming the welded portion (50) is the step (S6) of forming the welded portion (50) by emitting the energy beam (G) on the top surface (172) formed as a flat surface orthogonal to the rotational axis so as to deform the top surface (172) (into 72) so that the top surface (172) is inclined toward the rotation transmitting member (40) in the radial direction as the top surface (172) is inclined toward the direction away from the rotor core (20) out of the rotational axis direction. With such a configuration, by deforming the top surface (172), it is possible to increase the length in the rotational axis direction of the part in which the plate (30) and the rotation transmitting member (40) are joined and thus, further ensure joining strength of the plate (30) and the rotation transmitting member (40).

Further, in the above embodiment, as described above, the step (S1) of preparing the plate (30) is the step (S1) of preparing the plate (30) by forming the depressed portion (32) depressed in the rotational axis direction as the part (32) having the width (t4) in the rotational axis direction smaller than the width (t2) of the projected portion (70) in the rotational axis direction, so as to form the projected portion (70), which is projected from the bottom face (32a) of the depressed portion (32) serving as the end face (32a) in the rotational axis direction toward the direction away from the rotor core (20) out of the rotational axis direction, between the depressed portion (32) and the inner wall surface (31a) radially inward in the radial direction. With such a configuration, by preparing a plate member (steel plate) composed of an austenitic material having the fixed thickness (t2) in the rotational axis direction to form the depressed portion (32), it is possible to easily form the plate (30) that is provided with the projected portion (70).

In the above embodiment, as described above, the step (S6) of forming the welded portion (50) is the step (S6) of forming the welded portion (50) by melting the part of the rotation transmitting member (40) that is formed of S25C serving as the martensitic material and at least the part of the projected portion (70) of the plate (30) that is formed of SUS304 serving as the austenitic material, so that the melted area (S1) of the plate (30) in the radial section of the welded portion (50) is 40% or more and 80% or less of the radial section. With such a configuration, low-temperature cracking of the welded portion (50) can be made less likely to occur. The effect has been confirmed by the above measurement results.

In the above embodiment, as described above, the step (S5) of disposing the rotation transmitting member (40) is the step (S5) of disposing the rotation transmitting member (40) so that the outer diameter surface of the rotation transmitting member (40) formed as the hub member (40) that is extended in the rotational axis direction faces the inner wall surface (31a) of the plate (30) formed as the through hole in the radial direction, and the step (S6) of forming the welded portion (50) is the step (S6) of forming the welded portion (50) so that heat input to the projected portion (70) is transmitted to the heat releasing portion (41b) that is formed to be continuous and in flush with the facing surface (41a), which faces the inner wall surface (31a), out of the outer diameter surface (41), toward the direction away from the rotor core (20) out of the rotational axis direction. With such a configuration, since the heat transmitted to the hub member (40) can be transmitted to the heat releasing portion (41b), it is possible to reduce the melting ratio of the welded portion (50) in the hub portion (40) material composed of martensitic material. As a result, the melting ratio (r) of the plate (30) composed of the austenitic material in the welded portion (50) can be increased, so that joining strength of the plate (30) and the rotation transmitting member (40) can be ensured.

In the above embodiment, as described above, the step (S1) of preparing the plate (30) is the step (S1) of preparing the plate (30) having the core welding clearance portion (33) that is depressed from the end face (31a) of the plate (30) on one side in the radial direction to the other side in the radial direction at the position adjacent to the projected portion (70) in the circumferential direction, and the manufacturing method further includes the step (S6) of forming the core welded portion (50) by melting the rotor core (20) and the rotation transmitting member (40) while a part (25a, 25b) of the rotor core (20) is exposed in the direction away from the rotor core (20) out of the rotational axis direction via the core welding clearance portion (33). With such a configuration, the rotor core (20) and the rotation transmitting member (40) can be welded while the plate (30) is disposed on the end face (32a) of the rotor core (20) in the rotational axis direction. As a result, since the step (S7) of forming the core welded portion (60) and the step (S6) of forming the welded portion (50) can be performed continuously, it is possible to perform the step (S6) of forming the welded portion (50), without retracting the heat source device (200) from the vicinity of the rotor (100) (rotation transmitting member (40)), after the step (S6) of forming the core welded portion (50). As a result, it is possible to prevent the manufacturing process of the rotor (100) from being complicated.

[Modifications]

The embodiment disclosed herein is by way of example in all respects and should not be interpreted as restrictive. The scope of the present disclosure is defined by the scope of the claims, rather than the description of the above embodiment, and includes the scope of claims and all changes (modifications) within the meaning and scope equivalence.

For example, in the above embodiment, an example is described in which the rotor is configured as an inner rotor. However, the present disclosure is not limited to this. That is, the rotor may be configured as an outer rotor.

In the above embodiment, an example is described in which the welded portions are formed between the hub member and the end plate. However, the present disclosure is not limited to this. For example, the welded portions may be formed between the shaft member serving as the rotation transmitting member and the end plate, without providing the hub member.

In the above embodiment, stainless steel (SUS304 and SUS309) is indicated as the austenitic material forming the end plate. However, the present disclosure is not limited to this. That is, the material forming the end plate only needs to have an austenitic structure, and the end plate may be formed of an austenitic material other than austenitic stainless steel.

In the above embodiment, carbon steel (S25C and S35C) is indicated as the martensitic material for the hub member. However, the present disclosure is not limited to this. That is, the material forming the hub member only needs to have a martensitic structure, and the hub member may be formed of a martensitic material other than martensitic carbon steel.

Figure 15:
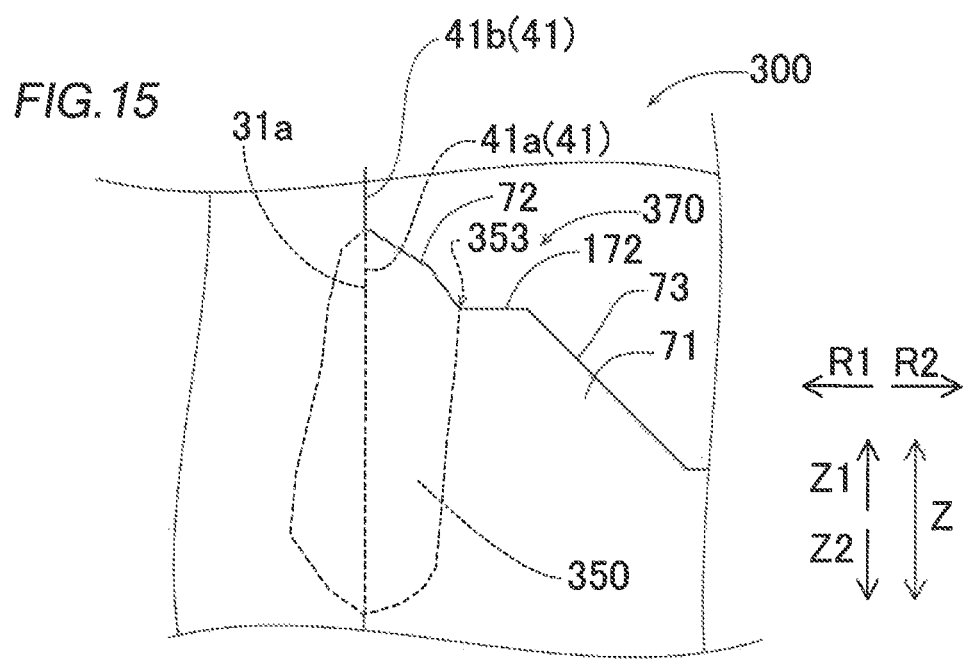
FIG. 15 is a diagram of a configuration of a rotor (a projected portion and the first welded portion) according to a first modification of the embodiment of the present disclosure.

In the above embodiment, an example is described in which the boundary portion of the first welded portion is provided on the inclined surface of the projected portion. However, the present disclosure is not limited to this. For example, as in a rotor 300 according to a first modification illustrated in FIG. 15, a boundary portion 353 of a first welded portion 350 may be provided on the top surface 172 of a projected portion 370. In this case, by forming the first welded portion 350, a part of the top surface 172 of the projected portion 370 becomes the top surface 72 having a shape with excess weld material and the other portion of the top surface 172 becomes a flat surface.

Figure 16:
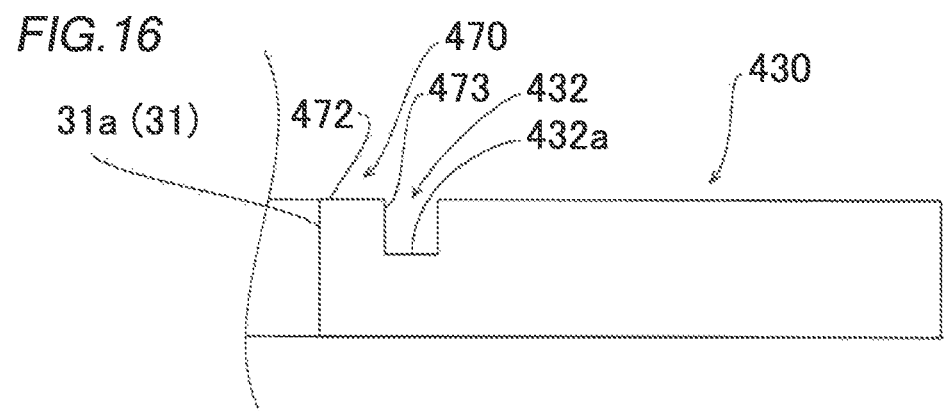
FIG. 16 is a diagram of a configuration of an end plate according to a second modification of the embodiment of the present disclosure.

In the above embodiment, an example is described in which the projected portion is provided with the surface inclined at 30 degrees or more and 60 degrees or less. However, the present disclosure is not limited to this. For example, as in an end plate 430 according to a second modified example illustrated in FIG. 16, a side face 473 that is a radially outward side face of a projected portion 470 and an inner side face of a depressed portion 432 may be formed generally in parallel with the rotational axis direction. The side face 473 is formed so as to connect a top surface 472 and a bottom face 432a.

Figure 17:
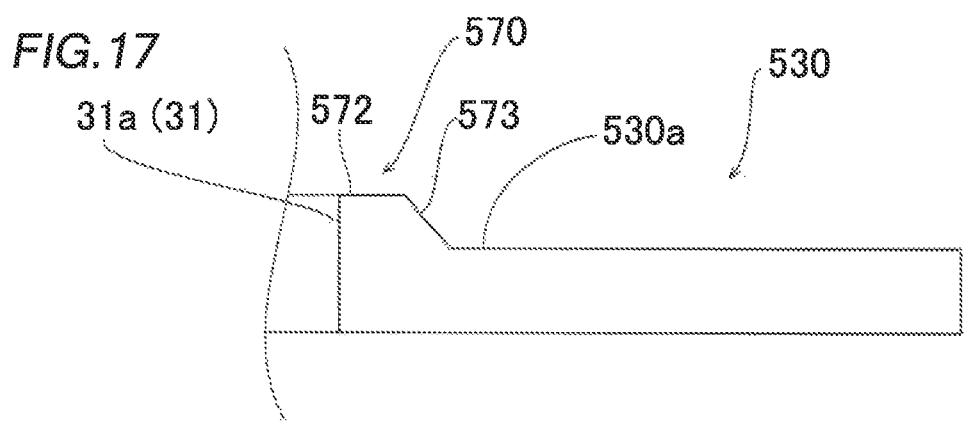
FIG. 17 is a diagram showing a configuration of an end plate according to a third modification of the embodiment of the present disclosure.

In the above embodiment, an example is described in which the depressed portion is formed in the end plate to form the projected portion in the end plate. However, the present disclosure is not limited to this. For example, as in an end plate 530 according to a third modified example illustrated in FIG. 17, a projected portion 570 protruding from an end face 530a in the rotational axis direction of the end plate 530 may be formed without forming a depressed portion. For example, an inclined surface 573 is formed so as to connect a top surface 572 and an end face 530a (a part having a width in the rotational axis direction smaller than the width of the projected portion 570 in the rotational axis direction).

In the above embodiment, an example is described in which the energy beam is emitted on the top surface while the beam center of the energy beam is positioned at a position offset to the end plate side in the radial direction from the plate-side joining end face, and the emission direction of the energy beam is inclined with respect to the rotational axis direction. However, the present disclosure is not limited to this. For example, when the end plate and the hub member are formed nearly flush along the radial direction, the energy beam may be emitted along the rotational axis direction without the beam center being offset. If the beam center is positioned at the position offset to the end plate side as in the above embodiment, it is possible to effectively increase the melting ratio of the end plate.

In the above embodiment, an example is described in which the width of the top surface in the radial direction is set to be larger than the beam diameter of the energy beam. However, the present disclosure is not limited to this. For example, the top surface may be configured to have a radial width that is the beam diameter of the energy beam or less. As in the above embodiment, since reflection and scattering are prevented when the width of the top surface in the radial direction is set to be larger than the beam diameter of the energy beam, the energy beam can be efficiently emitted on the projected portion.

In the above embodiment, an example is described in which the radial cross section of the inclined surface is formed to be linear. However, the present disclosure is not limited to this. For example, the inclined surface may be formed so that the radial cross section has an arc shape.

In the above embodiment, an example is described in which the heat releasing portion is provided in the hub member. However, the present disclosure is not limited to this. For example, the heat releasing portion does not have to be provided, if it is possible to sufficiently ensure the melting ratio of the end plate in the first welded portion without providing the heat releasing portion on the hub member by providing the projected portion in the end plate.

In the above embodiment, an example is described in which the clearance portion is formed as the recessed portion. However, the present disclosure is not limited to this. That is, the clearance portion need only be configured so that the rotor core and the hub member can be welded via the clearance portion. For example, the clearance portion may be formed as a through hole.

In the above embodiment, an example is described in which the step of forming the second welded portion is performed after the step of forming the first welded portion. However, the present disclosure is not limited to this. That is, the step of forming the first welded portion may be performed after the step of forming the second welded portion, or the step of forming the first welded portion and the step of forming the second welded portion may be performed alternately.

In the above embodiment, an example is described in which the end plates are disposed radially outward of the hub member (the hub member is disposed radially inward of the end plates). However, the present disclosure is not limited to this. That is, the end plates may be disposed radially inward of the hub member (the hub member may be disposed radially outward of the end plates).

In the above embodiment, an example is described in which the plate of the present disclosure is applied to the end plate. However, the present disclosure is not limited to this. That is, the plate of the present disclosure may be applied to a plate other than the end plate.

DESCRIPTION OF THE REFERENCE NUMERALS

20 Rotor core
30, 430, 530 End plate (plate)
31a Plate-side joining end face (inner wall surface)
32, 432 Depressed portion (part having width in rotational axis direction smaller than width of projected portion in rotational axis direction)
32a, 432a Bottom face (end face in rotational axis direction)
33 Clearance portion (core welding clearance portion)
40 Hub member (rotation transmitting member)
41a Hub-side joining end face (facing surface of outer diameter surface)
41b Heat releasing portion
50, 350 First welded portion (welded portion)
60 Second welded portion (core welded portion)
70, 370, 470, 570 Projected portion
72, 172, 472, 572 Top surface
73, 573 Inclined surface
100, 300 Rotor
150 Melted portion
530a End face (part having width in rotational axis direction smaller than width of projected portion in rotational axis direction)

The invention claimed is:

1. A manufacturing method of a rotor including a rotor core, a plate that is disposed on at least one side of the rotor core in a rotational axis direction, and a rotation transmitting member that is composed of a martensitic material and that is welded and fixed to the plate, the manufacturing method comprising:
   a step of preparing the plate that has a projected portion that is provided adjacent to the rotation transmitting member in a radial direction and that is projected, from an end face in the rotational axis direction, in a direction away from the rotor core out of the rotational axis direction, and a part that is adjacent to the projected portion in the radial direction and that has a width in the rotational axis direction smaller than a width of the projected portion in the rotational axis direction, the plate being formed of an austenitic material;
   a step of disposing the rotation transmitting member radially inward of the plate, after the step of preparing the plate; and
   a step of forming a welded portion across the projected portion of the plate and the rotation transmitting member by emitting an energy beam on at least a part of the projected portion to melt at least a part of the projected portion, after the step of disposing the rotation transmitting member.

2. The manufacturing method of a rotor according to claim 1, wherein
   the step of disposing the rotation transmitting member is the step of disposing the rotation transmitting member so that an inner wall surface radially inward of the projected portion faces an outer diameter surface of the rotation transmitting member in the radial direction; and
   the step of forming the welded portion is the step of forming the welded portion across the inner wall surface of the projected portion and the outer diameter surface of the rotation transmitting member.

3. The manufacturing method of a rotor according to claim 2, wherein the step of forming the welded portion is the step of forming the welded portion by melting a part of the rotation transmitting member that is formed of carbon steel serving as the martensitic material and at least a part of the projected portion of the plate that is formed of austenitic stainless steel serving as the austenitic material.

4. The manufacturing method of a rotor according to claim 2, wherein the step of forming the welded portion is the step of forming the welded portion by emitting the energy beam on a top surface of the projected portion in the rotational axis direction to melt at least a part of the projected portion so as to form a melted portion extending from the projected portion to the rotation transmitting member.

5. The manufacturing method of a rotor according to claim 4, wherein the step of forming the welded portion is the step of forming the welded portion by emitting the energy beam on the top surface so that a beam center of the energy beam is positioned at a position offset from the rotation transmitting member to a plate side in the radial direction and so that an emission direction of the energy beam is inclined from the plate side toward the rotation transmitting member with respect to the rotational axis direction.

6. The manufacturing method of a rotor according to claim 5, wherein the step of forming the welded portion is the step of forming the welded portion by forming the melted portion so that a width of the melted portion of the plate in the radial direction becomes gradually smaller and a width of the melted portion of the rotation transmitting member in the radial direction becomes gradually larger, in a direction toward the rotor core out of the rotational axis direction.

7. The manufacturing method of a rotor according to claim 4, wherein the step of forming the welded portion is the step of forming the welded portion by emitting the energy beam on the top surface of the projected portion that has a width in the radial direction larger than a beam diameter of the energy beam.

8. The manufacturing method of a rotor according to claim 4, wherein the step of preparing the plate is the step of preparing the plate having an inclined surface that is formed to be continuous with the top surface of the projected portion and an end face in the rotational axis direction and that is inclined from the top surface in a direction away from the rotation transmitting member in the radial direction with respect to the rotational axis direction.

9. The manufacturing method of a rotor according to claim 4, wherein the step of forming the welded portion is the step of forming the welded portion by emitting the energy beam on the top surface formed as a flat surface orthogonal to a rotational axis so as to deform the top surface so that the top surface is inclined toward the rotation transmitting member in the radial direction as the top surface is inclined toward a direction away from the rotor core out of the rotational axis direction.

10. The manufacturing method of a rotor according to claim 1, wherein the step of forming the welded portion is the step of forming the welded portion by melting a part of the rotation transmitting member that is formed of carbon steel serving as the martensitic material and at least a part of the projected portion of the plate that is formed of austenitic stainless steel serving as the austenitic material.

11. The manufacturing method of a rotor according to claim 1, wherein the step of forming the welded portion is the step of forming the welded portion by emitting the energy beam on a top surface of the projected portion in the rotational axis direction to melt at least a part of the projected portion so as to form a melted portion extending from the projected portion to the rotation transmitting member.

12. The manufacturing method of a rotor according to claim 11, wherein the step of forming the welded portion is the step of forming the welded portion by emitting the energy beam on the top surface so that a beam center of the energy beam is positioned at a position offset from the rotation transmitting member to a plate side in the radial direction and so that an emission direction of the energy beam is inclined from the plate side toward the rotation transmitting member with respect to the rotational axis direction.

13. The manufacturing method of a rotor according to claim 12, wherein the step of forming the welded portion is the step of forming the welded portion by forming the melted portion so that a width of the melted portion of the plate in the radial direction becomes gradually smaller and a width of the melted portion of the rotation transmitting member in the radial direction becomes gradually larger, in a direction toward the rotor core out of the rotational axis direction.

14. The manufacturing method of a rotor according to claim 11, wherein the step of forming the welded portion is the step of forming the welded portion by emitting the energy beam on the top surface of the projected portion that has a width in the radial direction larger than a beam diameter of the energy beam.

15. The manufacturing method of a rotor according to claim 11, wherein the step of preparing the plate is the step of preparing the plate having an inclined surface that is formed to be continuous with the top surface of the projected portion and an end face in the rotational axis direction and that is inclined from the top surface in a direction away from the rotation transmitting member in the radial direction with respect to the rotational axis direction.

16. The manufacturing method of a rotor according to claim 11, wherein the step of forming the welded portion is the step of forming the welded portion by emitting the energy beam on the top surface formed as a flat surface orthogonal to a rotational axis so as to deform the top surface so that the top surface is inclined toward the rotation transmitting member in the radial direction as the top surface is inclined toward a direction away from the rotor core out of the rotational axis direction.

17. The manufacturing method of a rotor according to claim 1, wherein the step of preparing the plate is the step of preparing the plate by forming a depressed portion depressed in the rotational axis direction as a part having a width in the rotational axis direction smaller than a width of the projected portion in the rotational axis direction so as to form the projected portion, which is projected from a bottom face of the depressed portion serving as an end face in the rotational axis direction toward a direction away from the rotor core out of the rotational axis direction, between the depressed portion and an inner wall surface radially inward in the radial direction.

18. The manufacturing method of a rotor according to claim 1, wherein the step of forming the welded portion is the step of forming the welded portion by melting a part of the rotation transmitting member that is formed of S25C serving as the martensitic material and at least a part of the projected portion of the plate that is formed of SUS304 serving as the austenitic material so that a melted area of the plate in a radial section of the welded portion is 40% or more and 80% or less of the radial section.

19. The manufacturing method of a rotor according to claim 1, wherein
the step of disposing the rotation transmitting member is the step of disposing the rotation transmitting member so that an outer diameter surface of the rotation transmitting member formed as a hub member that is extended in the rotational axis direction faces an inner wall surface of the plate formed as a through hole in the radial direction, and
the step of forming the welded portion is the step of forming the welded portion so that heat input to the projected portion is transmitted to a heat releasing portion that is formed to be continuous and in flush with a facing surface, which faces the inner wall surface out of the outer diameter surface, toward a direction away from the rotor core out of the rotational axis direction.

20. The manufacturing method of a rotor according to claim 1, wherein
the step of preparing the plate is the step of preparing the plate having a core welding clearance portion that is depressed from an end face of the plate on one side in the radial direction to the other side in the radial direction at a position adjacent to the projected portion in a circumferential direction, and
the manufacturing method further comprises a step of forming a core welded portion by melting the rotor core and the rotation transmitting member while a part of the rotor core is exposed in a direction away from the rotor core out of the rotational axis direction via the core welding clearance portion.

\* \* \* \* \*